(12) United States Patent
Montemurro (10) Patent No.: US 9,629,038 B2
(45) Date of Patent: Apr. 18, 2017

(54) METHODS AND APPARATUS FOR USE IN FACILITATING THE COMMUNICATION OF NEIGHBORING NETWORK INFORMATION TO A MOBILE TERMINAL WITH USE OF A RADIUS COMPATIBLE PROTOCOL

(75) Inventor: Michael Montemurro, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 25 days.

(21) Appl. No.: 12/793,977

(22) Filed: Jun. 4, 2010

(65) Prior Publication Data

US 2010/0313020 A1 Dec. 9, 2010

Related U.S. Application Data

(60) Provisional application No. 61/184,116, filed on Jun. 4, 2009.

(51) Int. Cl.
| | | |
|---|---|---|
| H04L 9/32 | (2006.01) | |
| H04W 36/00 | (2009.01) | |
| H04L 29/06 | (2006.01) | |
| H04W 12/06 | (2009.01) | |
| H04W 36/14 | (2009.01) | |

(52) U.S. Cl.
CPC ..... *H04W 36/0061* (2013.01); *H04L 63/0892* (2013.01); *H04W 12/06* (2013.01); *H04W 36/0083* (2013.01); *H04W 36/14* (2013.01)

(58) Field of Classification Search
CPC . G06F 21/43; H04L 63/0892; H04W 36/0061
USPC .................................. 713/154, 168
See application file for complete search history.

(56) References Cited

U.S. PATENT DOCUMENTS

| | | | |
|---|---|---|---|
| 7,281,137 B1 * | 10/2007 | Vitikainen | ............... 713/189 |
| 7,983,229 B2 | 7/2011 | Bachmann et al. | |
| 8,054,805 B2 * | 11/2011 | Xia et al. | ............... 370/331 |
| 8,233,441 B2 | 7/2012 | Bachmann et al. | |
| 8,730,908 B2 | 5/2014 | Jee | |
| 2002/0136226 A1 | 9/2002 | Christoffel et al. | |
| 2002/0183060 A1 | 12/2002 | Ko et al. | |

(Continued)

FOREIGN PATENT DOCUMENTS

| | | |
|---|---|---|
| CN | 101019460 | 8/2007 |
| CN | 101036356 | 9/2007 |

(Continued)

OTHER PUBLICATIONS

T. Narten et al. RFC 2461: Neighbor Discovery for IP Version 6 (IPv6). Dec. 1998. p. 1-93.*

(Continued)

*Primary Examiner* — Bradley Holder
*Assistant Examiner* — Jenise Jackson
(74) *Attorney, Agent, or Firm* — Fish & Richardson P.C.

(57) ABSTRACT

A disclosed example method for requesting neighboring network information from a device involves encoding a request for neighboring network information and sending the request to an authentication server to obtain the neighboring network information. The example method also involves receiving a response to the request, retrieving the neighboring network information contained in the response, and decoding the neighboring network information. The decoded neighboring network information is stored.

16 Claims, 8 Drawing Sheets

(56) References Cited

U.S. PATENT DOCUMENTS

| | | |
|---|---|---|
| 2002/0191575 A1 | 12/2002 | Kalavade et al. |
| 2003/0026223 A1 | 2/2003 | Eriksson et al. |
| 2003/0028763 A1 | 2/2003 | Malinen et al. |
| 2003/0119481 A1 | 6/2003 | Haverinen et al. |
| 2004/0029580 A1 | 2/2004 | Haverinen |
| 2004/0240669 A1* | 12/2004 | Kempf et al. ................ 380/277 |
| 2005/0094593 A1 | 5/2005 | Buckley |
| 2005/0154774 A1 | 7/2005 | Giaffreda |
| 2005/0232209 A1 | 10/2005 | Buckley et al. |
| 2006/0067526 A1* | 3/2006 | Faccin et al. .................. 380/46 |
| 2006/0077926 A1* | 4/2006 | Rune ....................... H04L 45/34 370/328 |
| 2006/0077986 A1* | 4/2006 | Rune ........................... 370/401 |
| 2006/0140150 A1* | 6/2006 | Olvera-Hernandez et al. ............... 370/331 |
| 2006/0179310 A1* | 8/2006 | Zhang ......................... 713/168 |
| 2006/0183479 A1* | 8/2006 | Liu et al. ..................... 455/436 |
| 2006/0187892 A1* | 8/2006 | Zhang .................. H04W 48/18 370/338 |
| 2006/0217147 A1 | 9/2006 | Olvera-Hernandez |
| 2006/0227746 A1* | 10/2006 | Kim et al. ..................... 370/331 |
| 2006/0240832 A1 | 10/2006 | Kim |
| 2007/0025298 A1 | 2/2007 | Jung |
| 2007/0147318 A1* | 6/2007 | Ross ..................... H04L 63/104 370/338 |
| 2007/0160049 A1* | 7/2007 | Xie et al. ....................... 370/390 |
| 2007/0201420 A1* | 8/2007 | Tejaswini ............. H04W 48/16 370/338 |
| 2007/0230453 A1* | 10/2007 | Giaretta et al. ............... 370/389 |
| 2007/0242637 A1 | 10/2007 | Dynarski |
| 2007/0250713 A1* | 10/2007 | Rahman et al. .............. 713/171 |
| 2007/0256122 A1* | 11/2007 | Foo et al. ......................... 726/5 |
| 2008/0070573 A1* | 3/2008 | Dutta .................... H04W 8/082 455/435.1 |
| 2008/0151796 A1 | 6/2008 | Jokela |
| 2008/0228942 A1* | 9/2008 | Lor ....................... H04L 63/107 709/238 |
| 2008/0233951 A1 | 9/2008 | Uchida |
| 2008/0280613 A1* | 11/2008 | Suh et al. ..................... 455/436 |
| 2008/0291876 A1* | 11/2008 | Mukherjee et al. .......... 370/331 |
| 2009/0010399 A1 | 1/2009 | Kim et al. |
| 2009/0046682 A1 | 2/2009 | Kim |
| 2009/0052347 A1* | 2/2009 | Kim ............................. 370/254 |
| 2009/0052393 A1* | 2/2009 | Sood et al. ................... 370/331 |
| 2009/0052396 A1* | 2/2009 | Bucker et al. ................ 370/331 |
| 2009/0054037 A1* | 2/2009 | Kaippallimalil ............. 455/411 |
| 2009/0109927 A1* | 4/2009 | Suh et al. ..................... 370/331 |
| 2009/0135758 A1* | 5/2009 | Alper et al. .................. 370/328 |
| 2009/0147752 A1* | 6/2009 | Chung et al. ................. 370/331 |
| 2009/0213795 A1* | 8/2009 | Barber et al. ................ 370/328 |
| 2009/0238139 A1* | 9/2009 | Kim et al. ..................... 370/331 |
| 2009/0282467 A1* | 11/2009 | Schenk ............................ 726/7 |
| 2010/0018011 A1 | 1/2010 | Borque Marquina et al. |
| 2010/0035578 A1* | 2/2010 | Ahmed .................. H04W 12/06 455/411 |
| 2010/0122321 A1* | 5/2010 | Sreemanthula et al. .......... 726/3 |
| 2010/0141400 A1* | 6/2010 | Radulescu ........ H04W 52/0225 340/10.33 |
| 2010/0146272 A1 | 6/2010 | Centonza |
| 2010/0180111 A1* | 7/2010 | Hahn .................. H04W 12/06 713/150 |
| 2010/0189077 A1* | 7/2010 | Kim ..................... H04W 36/005 370/331 |
| 2010/0199332 A1* | 8/2010 | Bachmann et al. ............... 726/4 |
| 2010/0215019 A1* | 8/2010 | Velev ....................... H04W 8/06 370/331 |
| 2010/0271978 A1* | 10/2010 | Gupta .................. H04W 48/14 370/254 |
| 2010/0275244 A1* | 10/2010 | Lor ....................... H04L 63/107 726/3 |
| 2010/0281249 A1* | 11/2010 | Das et al. ..................... 713/151 |
| 2010/0281519 A1* | 11/2010 | Das et al. ........................ 726/3 |
| 2011/0002273 A1* | 1/2011 | Youn ................. H04W 36/0055 370/328 |
| 2011/0004762 A1* | 1/2011 | Horn ..................... H04W 12/04 713/171 |
| 2011/0058550 A1 | 3/2011 | Gu |
| 2011/0072101 A1* | 3/2011 | Forssell et al. ............... 709/206 |
| 2011/0154454 A1* | 6/2011 | Frelechoux ....................... 726/5 |
| 2012/0096520 A1 | 4/2012 | Dutta |
| 2012/0149380 A1* | 6/2012 | Olson ................... H04W 36/32 455/443 |
| 2012/0291113 A1* | 11/2012 | Zapata et al. ...................... 726/7 |
| 2013/0064222 A1* | 3/2013 | Hancock ................. H04L 12/66 370/331 |
| 2013/0163562 A1 | 6/2013 | Dynarski |
| 2014/0082698 A1* | 3/2014 | Kim ....................... H04L 63/101 726/3 |
| 2014/0082714 A1* | 3/2014 | Sunder ..................... G06F 21/31 726/7 |
| 2015/0016609 A1 | 1/2015 | Malinen |
| 2015/0244876 A1 | 8/2015 | Jabara |
| 2015/0365881 A1* | 12/2015 | Scherzer ............... H04W 48/14 455/414.1 |

FOREIGN PATENT DOCUMENTS

| | | | |
|---|---|---|---|
| CN | 101176293 | 7/2008 | |
| EP | 1 528 715 | 5/2005 | |
| JP | 11127399 A | 5/1999 | |
| JP | 05389259 B2 | 1/2014 | |
| KR | 2006-0039126 | 5/2006 | |
| KR | 10-2009-0005971 | 1/2009 | |
| WO | 99/39524 | 8/1999 | |
| WO | 2008/016819 | 2/2008 | |
| WO | 2008/062098 | 5/2008 | |
| WO | WO 2008/110997 A2 * | 9/2008 | ............ H04L 29/06 |
| WO | WO2008110997 A2 | 9/2008 | |
| WO | 2008/132163 | 11/2008 | |
| WO | 2009/008627 | 1/2009 | |
| WO | WO 2009/008627 A2 * | 1/2009 | ............... H04B 7/26 |
| WO | 2009/051400 | 4/2009 | |
| WO | WO2010139058 A1 | 12/2010 | |

OTHER PUBLICATIONS

T. Narten et al. RFC 4861: Neighbor Discovery for IP Version 6 (IPv6). Sep. 2007. p. 1-97.*

Nagaraju et al, Adaptive Partial Dominating Set Algorithm for Mobile Ad-Hoc Networks, Jan. 9, 2009, ACM, pp. 1-4.*

Lee et al, Available Bandwidth-Based Association in IEEE 802.11 Wireless Lans, Oct. 31, 2008, ACM, pp. 132-139.*

Vivek Gupta, "IEEE P802.21 Media Independent Handover," IEEE 802 Plenary, San Diego, Jul. 18, 2006, 65 pages.

Haverinen et al., "Cellular Access Control and Charging for Mobile Operator Wireless Local Area Networks," IEEE Wireless Communications, Dec. 2002, 10 pages.

Haverinen et al., "EAP SIM Authentication," Network Working Group Internet Draft, Oct. 27, 2003, 72 pages.

Radius, Wikipedia, http://en.wikipedia.org/wiki/RADIUS, Dated Apr. 29, 2009, 9 pages.

HP, "Introduction to Diameter: White Paper," Manufactoring Part No. T1428-90011, Sep. 2002, 22 pages.

Song et al., "Interworking of 3G Cellular Networks and Wireless LANS," Int. J. Wireless and Mobile Computing, vol. 2, No. 4, 2007, 11 pages.

Patent Cooperation Treaty, "International Search Report," issued by the International Searching Authority in connection with related PCT application No. PCT/CA2010/000824, mailed Aug. 11, 2010 (3 pages).

Patent Cooperation Treaty, "Written Opinion of the International Searching Authority," issued by the International Searching Authority in connection with related PCT application No. PCT/CA2010/000824, mailed Aug. 11, 2010 (3 pages).

IEEE 802.21, Wikipedia, http://en.wikipedia.org/wiki/IEEE_802.21, Dated Apr. 29, 2009, 3 pages.

"Authentication, Authorization, and Accounting Overview," Cisco, [retrieved from http://www.cisco..com/en/US/products/ps6638/products_data_sheet09186a00804fe332.html] Apr. 29, 2009, 8 pages.

(56) References Cited

OTHER PUBLICATIONS

Fanny Mlinarsky, "A Glimpse at the Wireless Data Communications Standards," Octoscope, Aug. 8, 2007, [retrieved from http://www.octoscope.com/English/Collaterals/Presentations/octoScope_WirelessStandards_Pulvermedia_20070808.pdf], 19 pages.
Lisa Phifer, Tutorial Radius Fig. 1, [retrieved from http://www.wi-fiplanet.com/img/tutorial-radius-fig1.gif], Apr. 29, 2009, 1 page. (Companion to "Using RADIUS for WLAN Authentication" by L. Phifer).
Lisa Phifer, "Using RADIUS for WLAN Authentication, Part I," Wi-Fi Planet, Dec. 1, 2003, 5 pages.
Perez, et al. "Securing an Enterprise WLAN," Wireless Security Technology, Texas Collaborative for Teaching Excellence, 4 pages. Sep. 17, 2010.
Gondi et al., "Handover Method Using EAP," Network Working Group Internet Draft, Feb. 18, 2008, 14 pages.
Palekar et al., "Protected EAP Protocol (PEAP) Version 2," EAP Working Group Internet Draft, Oct. 15, 2004, 87 pages.
Cam-Winget et al., "The Flexible Flexible Authentication via Secure Tunneling Extensible Authentication Protocol Method (EAP-FAST)," Network Working Group, Request for Comments 4851, May 2007, 65 pages.
Aboba et al., "The Network Access Identifier," Network Working Group, Request for Comments 4282, Dec. 2005, 17 pages.
Rigney et al., "Remote Authentication Dial in User Service (RADIUS)," Network Working Group, Request for Comments 2865, Jun. 2000, 66 pages.
Rosenberg et al., "SIP: Session Initiation Protocol," Network Working Group, Request for Comments 3261, Jun. 2002, 270 pages.
Funk et al., "Extensible Authentication Protocol Tunneled Transport Layer Security Authenticated Protocol Version 0 (EAP-TTLSv0)," Network Working Group, Request for Comments 5281, Aug. 2008, 52 pages.
Beadles et al., "Criteria for Evaluating Network Access Server Protocols," Network Working Group, Request for Comments 3169, Sep. 2001, 18 pages.
Aboba et al., "Criteria for Evaluating Roaming Protocols," Network Working Group, Request for Comments 2477, Jan. 1999, 13 pages.
IEEE Standard for Local and metropolitan are networks, "Part 21: Media Independent Handover Services," IEEE std 802.21, Jan. 21, 2009, 323 pages.
Patent Cooperation Treaty, "International Preliminary Report on Patentability," issued by the International Bureau in connection with related PCT application No. PCT/CA2010/000824, mailed Dec. 15, 2011 (5 pages).
Canadian Intellectual Property Office, "Exam Report," issued on Apr. 18, 2012, in Canadian Patent Application No. 2,763,988, 3 pages.
Canadian Intellectual Property Office, "Exam Report," issued on Aug. 2, 2012, in Canadian Patent Application No. 2,763,988, 5 pages.
De La Oliva et al., "IEEE 802.21 (Media Independent Handover Services) Overview," IEEE, vol. 15, Issue 4, Aug. 2008, 7 pages.
Korean Intellectual Property Office, "Office Action," issued on May 27, 2013, in Korean Patent Application No. 10-2011-7028729, 5 pages.
Canadian Intellectual Property Office, "Office Action," issued in Canadian Application No. 2,763,988 on Apr. 18, 2013, 3 pages.
Japanese Patent Office, "Notice of Reasons for Rejection," issued on Dec. 10, 2012, in Japanese Patent Application No. 2012-513421, 4 pages.
Canadian Intellectual Property Office, "Exam Report," issued on Dec. 3, 2012, in Canadian Patent Application No. 2,763,988, 3 pages.
State Intellectual Property of People's Republic of China, "Office Action," issued in connection with Chinese Application No. 201080023863.0, Aug. 6, 2014 (13 pages).
Australian Patent Office, "Patent Examination Report No. 1," issued on Apr. 9, 2013, in connection with Australian Patent Application No. 2010256311 (2 pages).
State Intellectual Property of People's Republic of China, "Office Action," issued Nov. 26, 2013, in connection with Chinese Application No. 201080023863.0 (13 pages).
Japanese Patent Office, "Notice of Allowance," issued on Sep. 9, 2013, in connection with Japanese Patent Application No. 2012-513421 (3 pages).
Korean Intellectual Property Office, "Office Action," issued on Nov. 19, 2013, in connection with Korean Patent Application No. 10-2011-7028729 (10 pages).
Canadian Intellectual Property Office, "Exam Report," issued in connection with Canadian Application No. 2,763,988, Apr. 9, 2014 (6 pages).
Mexican Institute of Industrial Property, "Office Action," issued in connection with Mexican Patent Application No. MX/a/2011/012802, Mar. 7, 2014 (3 page).
Canadian Intellectual Property Office, "Office Action," issued in Canadian Application No. 2,763,988 on Aug. 19, 2013, 3 pages.
Notice of Allowance in Mexican App. No. MX/a/2011/012802 dated Jun. 16, 2014, 1 page.
Shapiro, "Structure and encapsulation in distributed system: the Proxy Principle," Proc. 6th Int. Conf. on Distributed Computer Systems, pp. 198-204, Retreived from the Internet: < URL: http://pagesperso-systeme.lip6.fr/Marc.Shapiro/papers/SEDSPP_icdcs86.pdf>, May 1986.
Extended European Search Report issued in European Application No. 10782861.8 on Feb. 28, 2017.

* cited by examiner

METHODS AND APPARATUS FOR USE IN FACILITATING THE COMMUNICATION OF NEIGHBORING NETWORK INFORMATION TO A MOBILE TERMINAL WITH USE OF A RADIUS COMPATIBLE PROTOCOL

RELATED APPLICATIONS

This patent claims the benefit of U.S. Provisional Patent Application No. 61/184,116, filed on Jun. 4, 2009, which is hereby incorporated herein by reference in its entirety.

BACKGROUND

Field of the Technology

The present disclosure relates generally to communication techniques for assisting wireless mobile terminals for wireless communications, and more particularly to techniques for facilitating the communication of neighboring network information to mobile terminals for handover purposes.

Description of the Related Art

Mobile terminals may be adapted to operate in one or more of a variety of different types of wireless networks, such as wireless local area networks (WLANs), WiMAX networks, cellular telecommunication networks, etc. When operating in a WLAN or WiMAX network, the mobile terminal may lose radio coverage with the network or otherwise need to switch to an alternative neighboring wireless network to continue communications.

To do this, the mobile terminal could scan using its one or more wireless transceivers to identify available wireless networks in its coverage region. Excessive scanning by the mobile terminal, however, may consume too much time and power of the mobile terminal. It may be helpful, on the other hand, if the identifications of the available wireless networks could be obtained by the mobile terminal via the current wireless network before the switching occurs. Given the new network components and modules which could be required to achieve this goal, however, deployment could become burdensome and difficult, especially given the many diverse wireless networks already in existence today.

BRIEF DESCRIPTION OF THE DRAWINGS

Embodiments of present disclosure will now be described by way of example with reference to attached figures, wherein.

DETAILED DESCRIPTION

What are described herein are methods and apparatus for use in facilitating the communication of neighboring network information to a mobile terminal. The communication of neighboring network information to mobile terminals for handover purposes as described herein does not require excessive scanning by the mobile terminal, and does not require burdensome and difficult deployment of network components or modules.

One illustrative technique is employed in a radio access network, such as a wireless local area network (WLAN). This technique involves the steps of receiving, from the mobile terminal, a request for neighboring network information; producing, in response to receiving the request, a corresponding request for the neighboring network information in accordance with a remote access dial-in user server (RADIUS) compatible protocol; sending the corresponding request to an information server (e.g. an authentication, authorization, and accounting (AAA) server) of a core network of a public land mobile network (PLMN) associated with the mobile terminal; receiving, from the information server, in response to the corresponding request, the neighboring network information in accordance with the RADIUS compatible protocol; and sending, in response to the request, the neighboring network information to the mobile terminal. The request/response for the neighboring network information may be an IEEE 802.21 information request/response. If the radio access network is a WLAN adapted in accordance with IEEE 802.11, the request/response may be communicated in accordance with IEEE 802.11u (e.g. generic access service or GAS) or an extensible authentication protocol (EAP). If the radio access network is a WiMAX network adapted in accordance with IEEE 802.16, the request/response may be communicated in accordance with IEEE 802.16g.

Another illustrative technique is employed in the information server of the core network of the PLMN and involves receiving, from the radio access network, a request for neighboring network information in accordance with the RADIUS compatible protocol; retrieving, in response to receiving the request, neighboring network information corresponding to an indication provided in the request; and sending, to the network access server, in response to receiving the request, the retrieved neighboring network information in accordance with the RADIUS compatible protocol.

Figure 1:
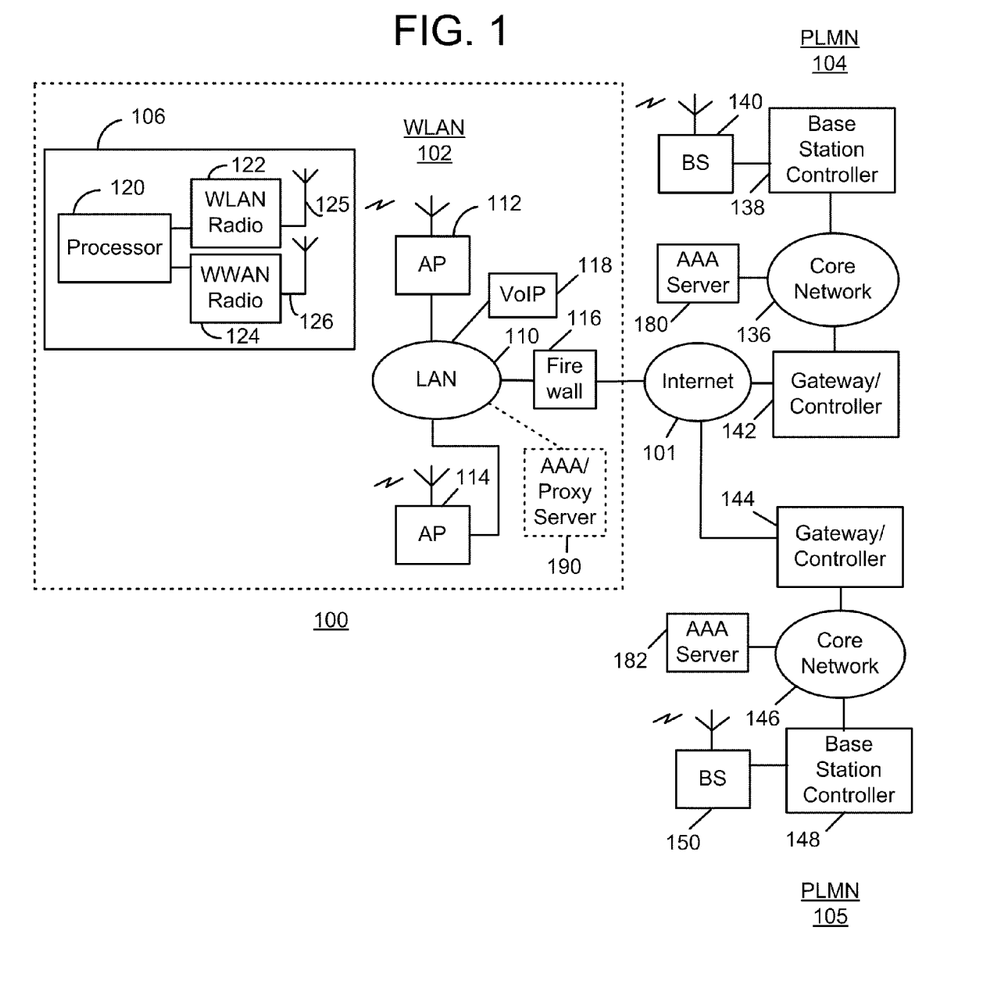
FIG. 1 is an illustrative representation of a communication system which includes a radio access network (RAN), which may be a wireless local area network (WLAN) such as an IEEE 802.11-based wireless network, and a wireless wide area network (WWAN) such as a public land mobile network (PLMN), within which a mobile terminal may operate.

To help further illustrate these techniques, FIG. 1 is an illustrative representation of a communication system 100 which includes a wireless local area network (WLAN) 102 and a public land mobile network (PLMN) 104. WLAN 102 may be or be referred to as one type of radio access network (RAN) utilized by a mobile terminal 106. Having one or more base stations and base station controllers, PLMN 104 may be or be referred to as a wireless wide area network (WWAN) or a mobile telecommunications network which may be further utilized by mobile terminal 106.

In the embodiment described, WLAN 102 is an IEEE 802.11-based wireless network. WLAN 102 may be part of a communication network such as a local area network (LAN) 110. In this embodiment, LAN 110 is part of a private communication network, which may be an enterprise network of an enterprise having a gateway including a firewall 116. Alternatively, LAN 110 may be a public communication network which may not require any gateway. Terminals may connect to LAN 110 through any suitable means, such as through a plurality of wireless access points (APs) (e.g. APs 112 and 114) of WLAN 102. Such mobile terminals and wireless APs can operate in accordance with IEEE 802.11 standards.

LAN 110, which includes WLAN 102, provides various local data and communication services to its terminals. For example, LAN 110 may provide for voice telephony communication services for its terminals with use of Voice over IP (VoIP) communications. For such services, LAN 110 may utilize servers such as a VoIP type server 118 or at least one session server which is a session initiation protocol (SIP) server. Communication applications, such as VoIP applications, may require the use of SIP. SIP is well-documented in standard documents such as Request For Comments (RFC) 3261. In some embodiments, LAN 110 also includes an AAA proxy server (or "proxy server") 190, the purpose and use of which will be described in more detail below.

Note that each wireless AP may include or cooperate with a network access server (NAS) function of WLAN 102. In general, a NAS serves as a gateway for a network to guard access to a protected resource; typically, when a mobile terminal connects to a NAS, the NAS communicates with another network resource to identify whether credentials of the mobile terminal are valid for granting/denying access.

PLMN 104 includes a core network 136, a plurality of base station controllers such as a base station controller (BSC) 138 coupled to core network 136, and a plurality of base stations such as a base station (BS) 140 coupled to associated BSCs 138. Core network 136, BSC 138, and base station 140 operate in a conventional fashion as well-documented. Other PLMNs in the environment have a similar or the same architecture as PLMN 104, such as a PLMN 105 having a core network 146, a plurality of base station controllers such as a base station controller (BSC) 148, a plurality of base stations such as a base station (BS) 150 coupled to associated BSCs 148, and a gateway/controller 144 provided between the Internet 101 and core network 146.

In this example, mobile terminal 106 of LAN 110 is shown as a mobile communication device/wireless handset (WH) of the dual-mode type, having both WLAN and WWAN radio interfaces. In particular, mobile terminal 106 is shown to have one or more processors 120, a WLAN radio interface 122, a WWAN radio interface 124, and antenna components 125 and 126 coupled to radio interfaces 122 and 124. Thus, mobile terminal 106 may access services of core network 136 of PLMN 104 with use of WWAN radio interface 124, as well as access services of LAN 110 with use of WLAN radio interface 122.

Communications between LAN 110 and core network 136 of PLMN 104 may be facilitated through a suitable connecting network such as a broadband, wide-area IP communication network (e.g. the Internet 101) or any suitable public or private wide area network. Gateway/controller 142 is provided between the Internet 101 and core network 136 of PLMN 104 in order to facilitate access to core network 136 by terminals through alternative links (e.g. radio links wireless APs 112 and 114) different than those conventional radio links offered in the PLMN 104 (e.g. radio links of base station 140). Thus, mobile terminal 106 may also access services of core network 136 of PLMN 104 via WLANs, such as WLAN 102, through use of WLAN radio interface 122. For such communications, gateway/controller 142 and mobile terminal 106 are adapted to establish and maintain a (secure) tunnel connection between each other through the intervening networks. Note that WLAN 102 may be operator-controlled or provided (e.g. controlled or provided by the operator associated with PLMN 104), user-controlled or provided (e.g. controlled or provided by the end user of mobile terminal 106), or third-party-controlled or provided.

Core network 136 also has an authentication, authorization, and accounting (AAA) server 180. Similarly, core network 146 has an AAA server 182. Such AAA servers 180 and 182 may operate in accordance with a Remote Authentication Dial-In User Service (RADIUS) protocol (e.g. RFC 2865) or RADIUS compatible protocol. Hence, AAA servers 180 and 182 may be or be referred to as RADIUS servers. The idea behind a central AAA server is that, instead of requiring every NAS to maintain a list of authorized user-names and passwords, RADIUS Access-Requests are forwarded to the AAA server. Thus, use of a central user database is provided, consolidating decision-making at a single point, while allowing calls to be supported by a large, physically-distributed set of NASs. Such AAA servers and protocols are already widely deployed and in use in a variety of different networks.

When mobile terminal 106 connects, the NAS typically sends a RADIUS Access-Request message to AAA server 180, relaying information such as the user's name and password, type of connection (port), NAS identity, and a message Authenticator. Upon receipt, AAA server 180 uses the packet source, NAS identity, and Authenticator to determine whether the NAS is permitted to send requests. If so, AAA server 180 attempts to identify the user's name in its database. It then applies the password and perhaps other attributes carried in the Access-Request to decide whether access should be granted to this user. Depending upon the authentication method being used, AAA server 180 may return a RADIUS Access-Challenge message that carries a random number. The NAS relays the challenge to mobile terminal 106, which must respond with the correct value to prove its asserted identity (e.g. encrypting the challenge with its password), which the NAS relays to AAA server 180 inside another RADIUS Access-Request message. If AAA server 180 is satisfied that mobile terminal 106 is authentic and authorized to use the requested service, it returns a RADIUS Access-Accept message. If not, AAA server 180 returns a RADIUS Access-Reject message and the NAS disconnects mobile terminal 106. When an Access-Accept message is received and RADIUS Accounting is enabled, the NAS sends a RADIUS Accounting-Request (Start) message to AAA server 180. AAA server 180 adds an accounting record to its log and acknowledges the request, whereupon the NAS activates the user's session. At the end of the session, a similar RADIUS Accounting-Request (Stop) message is exchanged so that accounting records will reflect the actual session duration and disconnect reason.

Alternatively, AAA servers 180 and 182 may operate in accordance with a different (but nonetheless RADIUS compatible) protocol, such as a Diameter protocol. A Diameter NASREQ (network access server requirements) application provides for AAA services. The Diameter NASREQ application uses existing RADIUS attributes where possible to carry data objects, to ease migration of existing RADIUS servers to Diameter, and to reduce the protocol conversion work required for a server that acts as a RADIUS/Diameter gateway.

Diameter is defined in terms of a base protocol and a set of applications, which allows the protocol to be extended to new access technologies. The base protocol provides basic mechanisms for reliable transport, message delivery, and error handling. The base protocol is used in conjunction with a Diameter application. Each application relies on the services of the base protocol to support a specific type of network access. The two major applications are Mobile IPv4 and NASREQ. The base protocol defines the basic Diameter message format. Data is carried within a Diameter message as a collection of Attribute-Value Pairs (AVPs), which are similar to RADIUS attributes. An AVP consists of multiple fields including an AVP Code, a Length, Flags, and Data. RFC 3169, Criteria for Evaluating Network Access Server Protocols, defines a number of requirements for AAA protocols used by NASs, addressing transport requirements, scalability, server failover, AVP requirements, security, authentication, authorization, policy, resource management, accounting, and more. RFC 2477, Criteria for Evaluating Roaming Protocols, similarly addresses the needs of AAA protocols supporting a roaming environment. The Diameter NASREQ application (combined with the base protocol) satisfies the requirements of both of these specifications. Even further, the NASREQ application, with native Extensible Authentication Protocol (EAP), offers secure authentication. The NASREQ application defines the Diameter-EAP-Request and Diameter-EAP-Answer messages that allow the EAP payload to be encapsulated within the Diameter protocol. The NASREQ application's AA-Request message corresponds to the RADIUS Access-Request. The AA-Answer message corresponds to the RADIUS Access-Accept and Access-Reject messages. The NASREQ application has guidelines to be used by a server that acts as a RADIUS-Diameter protocol gateway, i.e. a server that receives a RADIUS message that is to be translated and transmitted as a Diameter message, and vice versa.

Note that the description of the architecture for FIG. 1 relates to a specific example for illustration, where the WLAN is an IEEE 802.11-based network and the WWAN is a cellular telecommunications network. However, the WLAN and WWAN may be networks different from those networks. The WLAN may be a WiMAX-based network (i.e. IEEE 802.16), a Ultra-WideBand (UWB)-based network (i.e. IEEE 802.15), a Bluetooth-based network, as a few examples. The WWAN may be a Long-Term Evolution (LTE)-based network, an EVolution-Data Only (EV-DO)-based network, or a UMTS-based network, as a few examples.

Figure 2:
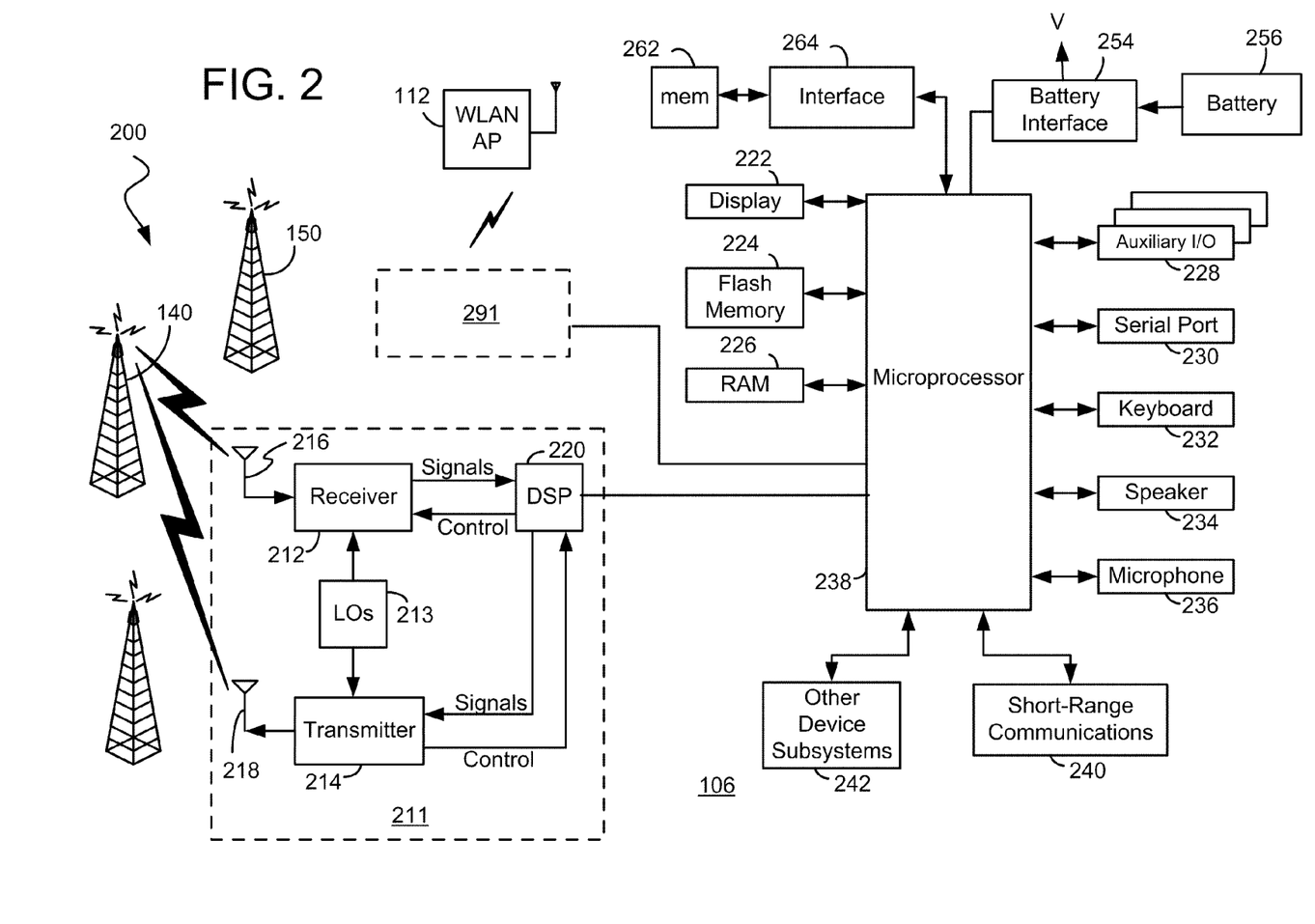
FIG. 2 is a schematic diagram of the mobile terminal which may operate in both the WLAN and the PLMN of FIG. 1.

Referring now to FIG. 2, electrical components of a typical mobile terminal 106 (e.g. a wireless handset, a mobile station) which operates in a wireless network environment which includes both WLANs (represented in FIG. 2 by AP 112) and WWANs/PLMNs (represented in FIG. 2 by cellular base stations 200 which include base stations 140 and 150 for its associated PLMNs) are now described. Mobile terminal 106 may be representative of one or more terminals which operate in communication system 100 of FIG. 1. Mobile terminal 106 can be a two-way communication device having at least voice and advanced data communication capabilities, including the capability to communicate with other computer systems. Depending on the functionality provided by mobile terminal 106, it may be referred to as a data messaging device, a two-way pager, a cellular telephone with data messaging capabilities, a wireless Internet appliance, or a data communication device (with or without telephony capabilities).

As shown in FIG. 2, mobile terminal 106 is adapted to wirelessly communicate with base stations 200. For communication with base stations 200, mobile terminal 106 utilizes a communication subsystem 211 which includes RF transceiver circuitry. Communication subsystem 211 includes a receiver 212, a transmitter 214, and associated components, such as one or more (embedded or internal) antenna elements 216 and 218, local oscillators (LOs) 213, and a digital signal processor (DSP) 220. The specific design of communication subsystem 211 depends on the communication network in which mobile terminal 106 is intended to operate. In the present application, communication subsystem 211 (including its associated processor/processing components) are operative in accordance with a cellular or other suitable WWAN standards (i.e. a standard other than IEEE 802.11), such as GSM/GPRS standards.

Mobile terminal 106 may send and receive communication signals through the network after required network procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These processed signals are input to transmitter 214 for digital-to-analog (D/A) conversion, frequency up conversion, filtering, amplification and transmission through the network via antenna 218. DSP 220 not only processes communication signals, but may also provide for receiver and transmitter control. Note that receiver 212 and transmitter 214 may share one or more antennas through an antenna switch (not shown in FIG. 2), instead of having two separate dedicated antennas 216 and 218 as shown.

Mobile terminal 106 also has a communication subsystem 291 which includes RF transceiver circuitry operative in accordance with a suitable WLAN standard, such as the IEEE 802.11 standard, for communications with WLANs (e.g. represented by AP 112 in FIG. 2). Communication subsystem 291 is similar in structure and functionality to communication subsystem 211, where DSP 220 may be replaced with a processing module referred to as a baseband (BB) and media access control (MAC) module. Although mobile terminal 106 may have separate and independent subsystems for these purposes, at least some portions or components of these otherwise different subsystems may be shared where possible. As mobile terminal 106 operates in accordance with both a cellular network interface standard (e.g. GSM/GPRS standard) and the IEEE 802.11 standard, it may be referred to as a "dual mode" mobile terminal.

Since mobile terminal 106 may be a handheld, portable, battery-powered device, it also includes a battery interface 254 for receiving one or more rechargeable batteries 256. Such a battery 256 provides electrical power to most if not all electrical circuitry in mobile terminal 106, and battery interface 254 provides for a mechanical and electrical connection for it. Battery interface 254 is coupled to a regulator (not shown in FIG. 2) that provides a regulated voltage V to all of the circuitry.

Mobile terminal 106 includes a microprocessor 238 (one type of processor or controller) that controls overall operation of mobile terminal 106. This control includes the communication techniques of the present disclosure. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard (or keypad) 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 can be stored in a persistent store such as flash memory 224, which may alternatively be a read-only memory (ROM) or similar storage element (not shown). Specific device applications, or parts thereof, may be temporarily loaded into a volatile store such as RAM 226.

Microprocessor 238, in addition to its operating system functions, enables execution of software applications on mobile terminal 106. A predetermined set of applications that control basic device operations, including at least data and voice communication applications, will normally be programmed and/or installed on mobile terminal 106 during its manufacture (including the network selection control techniques of the present disclosure). An application that may be loaded onto mobile terminal 106 may be a personal information manager (PIM) application having the ability to organize and manage data items relating to user such as, but not limited to, e-mail, calendar events, voice mails, appointments, and task items. Naturally, one or more memory stores are available on mobile terminal 106, and memory 262 (designed as "mem" in FIG. 2) such as a subscriber identity module (SIM) or the like coupled via an interface 264 is used to facilitate storage of PIM data items and other user information.

The PIM application has the ability to send and receive data items via the wireless network. In one embodiment, PIM data items are seamlessly integrated, synchronized, and updated via the wireless network, with the wireless device user's corresponding data items stored and/or associated with a host computer system thereby creating a mirrored host computer on mobile terminal 106 with respect to such items. This can be especially useful where the host computer system is the wireless device user's office computer system. Additional applications may also be loaded onto mobile terminal 106 through network, an auxiliary I/O subsystem 228, serial port 230, short-range communications subsystem 240, or any other suitable subsystem 242, and installed by a user in RAM 226 or a non-volatile store (not shown) for execution by microprocessor 238. Such flexibility in application installation increases the functionality of mobile terminal 106 and may provide enhanced on-device functions, communication-related functions, or both. For example, secure communication applications may enable electronic commerce functions and other such financial transactions to be performed using mobile terminal 106.

In a data communication mode, a received signal such as a text message, an e-mail message, or web page download will be processed by communication subsystem 211 and input to microprocessor 238. Microprocessor 238 will further process the signal for output to display 222 or alternatively to auxiliary I/O device 228. A user of mobile terminal 106 may also compose data items, such as e-mail messages, for example, using keyboard 232 in conjunction with display 222 and possibly auxiliary I/O device 228. Keyboard 232 is a complete alphanumeric keyboard and/or telephone-type keypad. These composed items may be transmitted over a communication network through communication subsystem 211. For voice communications, the overall operation of mobile terminal 106 is substantially similar, except that the received signals would be output to speaker 234 and signals for transmission would be generated by microphone 236. Alternative voice or audio I/O subsystems, such as a voice message recording subsystem, may also be implemented on mobile terminal 106. Although voice or audio signal output is accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile terminal 106 by providing for information or software downloads to mobile terminal 106 other than through a wireless communication network. The alternate download path may, for example, be used to load an encryption key onto mobile terminal 106 through a direct and thus reliable and trusted connection to thereby provide secure device communication. Short-range communications subsystem 240 of FIG. 2 is an additional optional component that provides for communication between mobile terminal 106 and different systems or devices, which need not necessarily be similar devices. For example, subsystem 240 may include an infrared device and associated circuits and components, or a BLUETOOTH® communication module to provide for communication with similarly enabled systems and devices. BLUETOOTH® is a registered trademark of Bluetooth SIG, Inc.

Although a specific mobile terminal 106 has just been described, any suitable mobile communication device or terminal may be part of the disclosed methods and apparatus which will be described in fuller detail below.

Figure 3:
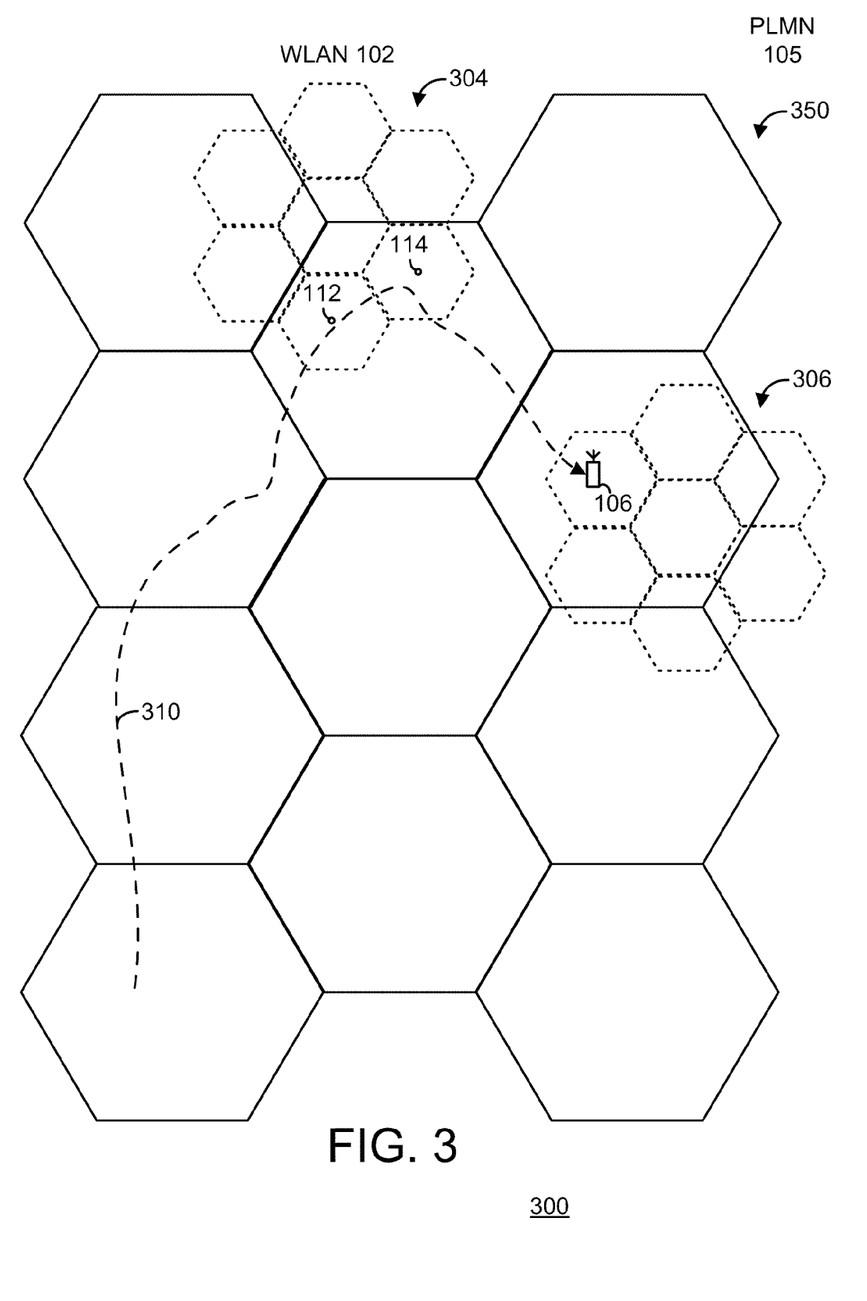
FIG. 3 is a top down view showing the mobile terminal moving in accordance with a travel path through coverage regions of the WLAN and the PLMN of FIG. 1.

FIG. 3 is a top down view of a geographic region 300, which shows mobile terminal 106 moving in accordance with a travel path 310 through a coverage region 350 of PLMN 105 (e.g. a GSM/GPRS based network) and a coverage region 304 of WLAN 102. Coverage region 350 of PLMN 105 may be defined by one or more base stations of the network, whereas coverage region 304 of WLAN 102 may be defined by one or more wireless APs 112 and 114 of the network. Another coverage region 306 may be that of another wireless network, such as another WLAN or, alternatively, a WiMAX network. As shown, coverage regions 304 and 306 may overlap in whole or in part with coverage region 350 of PLMN 105. As described earlier, mobile terminal 106 may have different transceiver portions (e.g. WLAN radio interface 122 and WWAN radio interface 124 of FIG. 1, or communication subsystems 211 and 291 of FIG. 2) associated with the two different types of networks (WLAN and WWAN). Mobile terminal 106 may generally have wireless access to only one of the networks for services at any given time. As it moves along travel path 310, in order to maintain continuity in service when losing coverage with its current wireless network, mobile terminal 106 is required to switch its communication operations to a different wireless network. For example, mobile terminal 106 may switch communication operations from WLAN 102 to PLMN 105.

Figure 7:
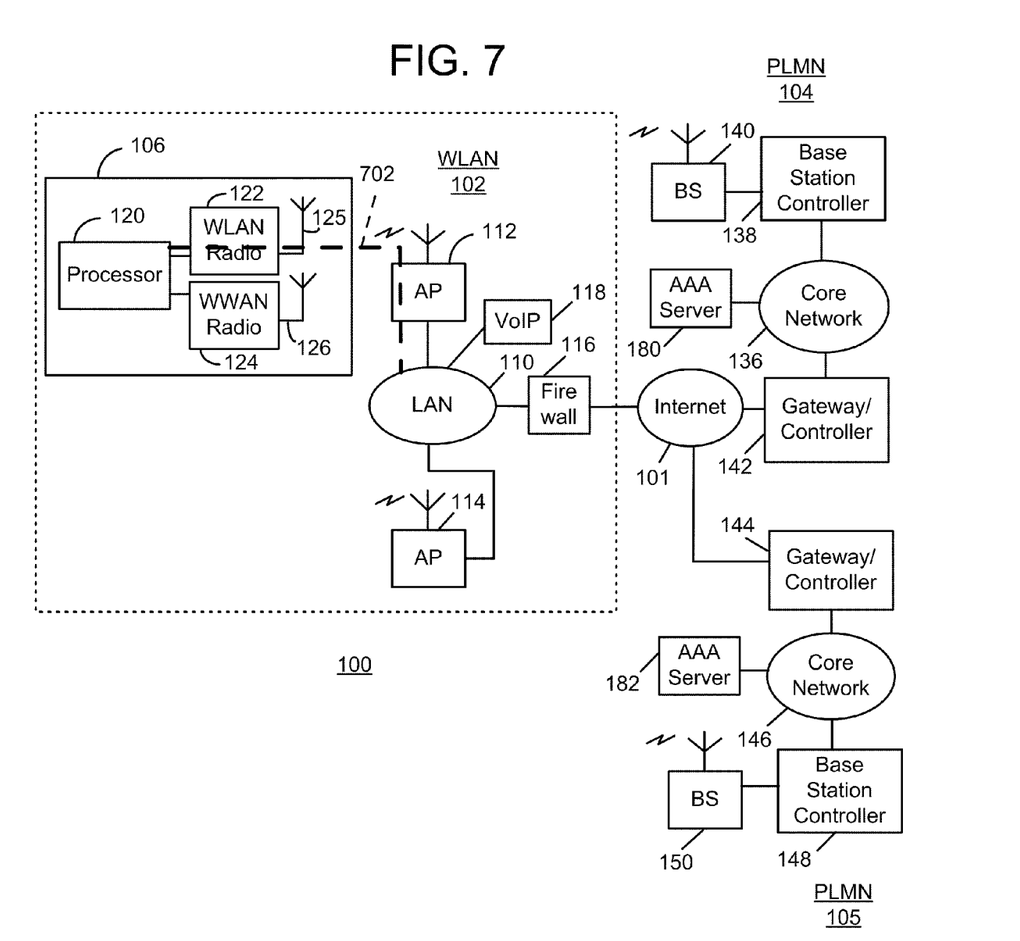
FIG. 7 is an illustrative representation of the communication system of FIG. 1, where the mobile terminal is shown to perform communication operations in the WLAN.
Figure 8:
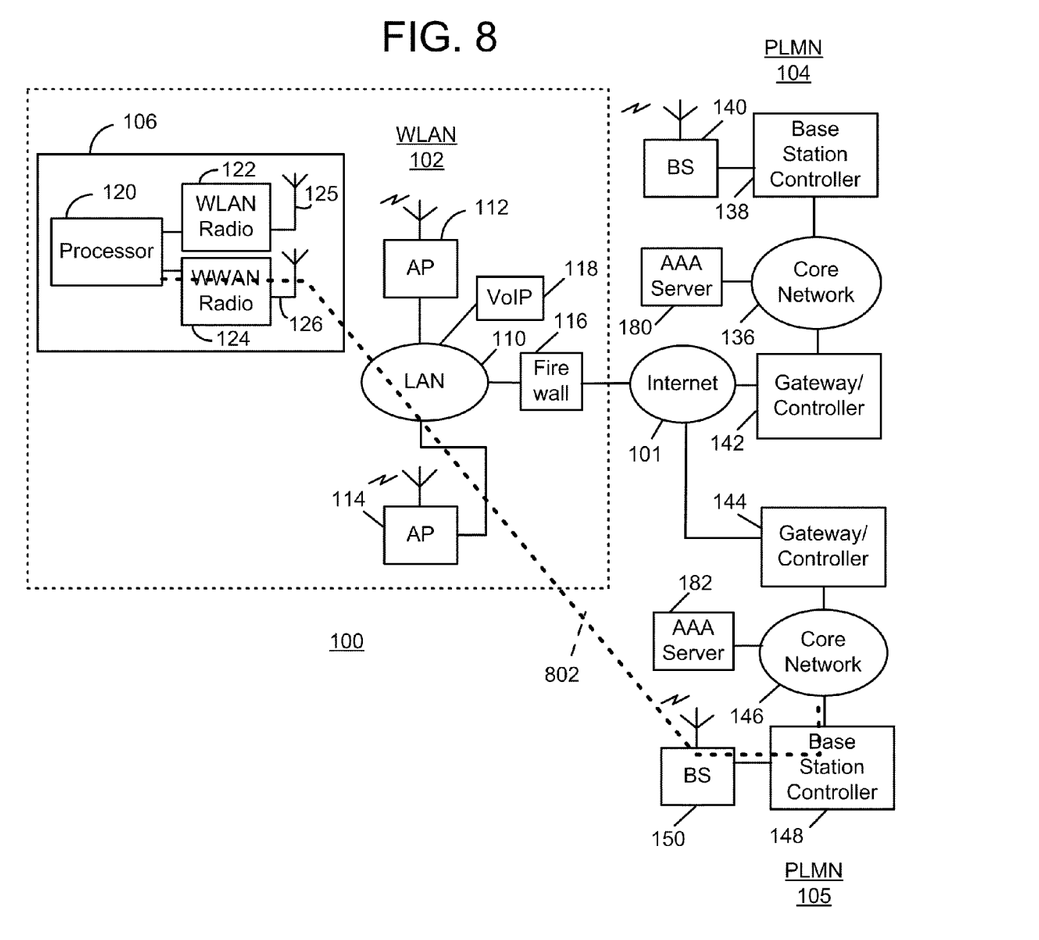
FIG. 8 is an illustrative representation of the communication system of FIG. 1, where the mobile terminal switches from communication operations in the WLAN to the PLMN.

This is shown in more detail with reference ahead to FIGS. 7 and 8. In FIG. 7, an illustrative representation of the communication system of FIG. 1 is shown, where mobile terminal 106 performs communication operations in WLAN 102 over a wireless link 702. On the other hand, in FIG. 8, mobile terminal 106 is shown to switch from communication operations in WLAN 102 to PLMN 105 over a wireless link 802. The general methodology for switching may be based on processing of a received signal strength indicator (RSSI) of a radio frequency (RF) signal from the wireless AP of the WLAN (e.g. AP 112 of WLAN 102), or a signal-to-noise ratio (SNR) of the RF signal from the wireless AP, or other signal conditions or events. The switching operation may be initiated by mobile terminal 106 itself, or with the assistance or instruction from the network.

Figure 4:
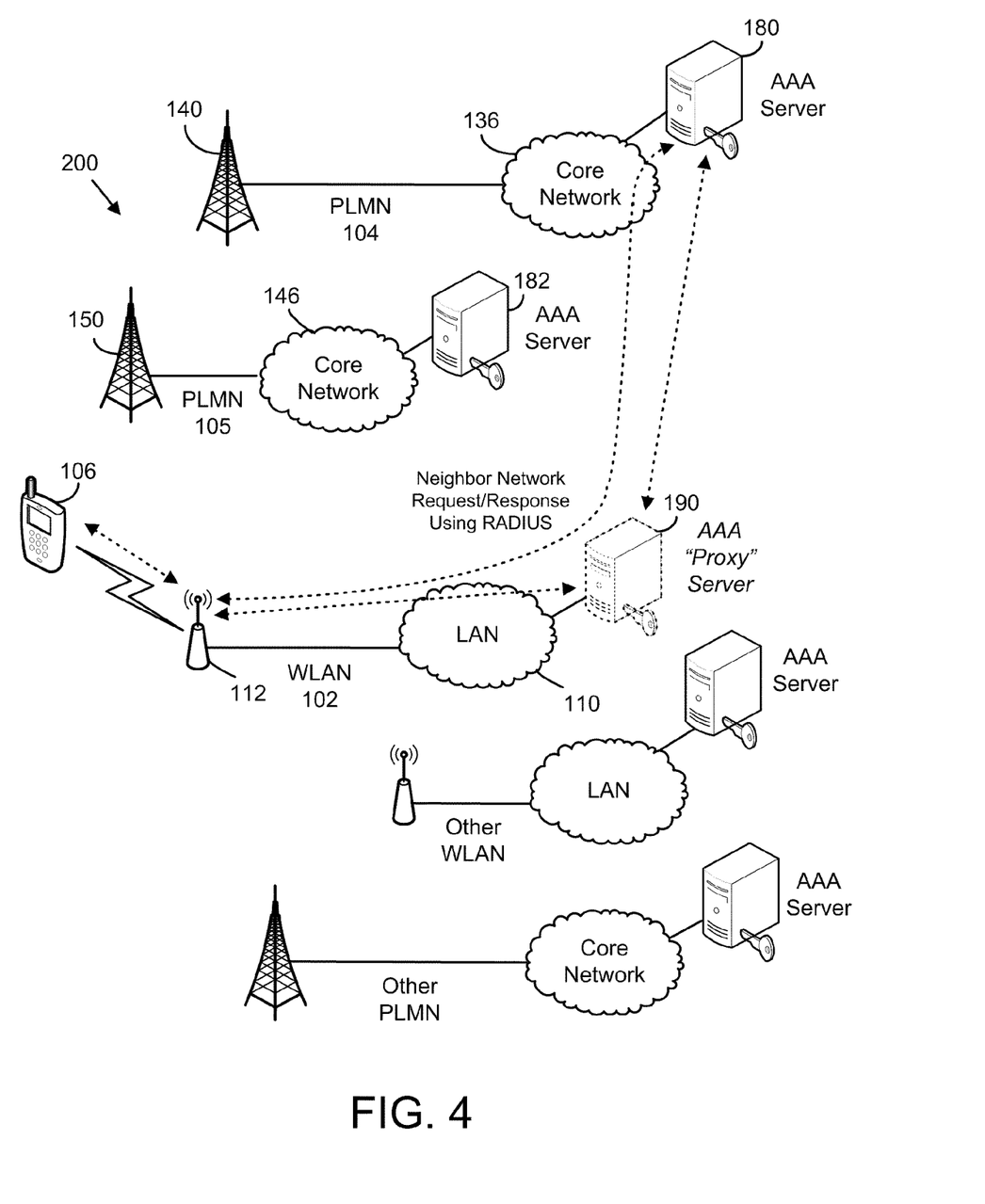
FIG. 4 is a general illustrative representation of the communication system of FIG. 1 which may be utilized for facilitating the communication of neighboring network information to the mobile terminal.

Referring now to FIG. 4, a general illustrative representation of the communication system of FIG. 1 which may be utilized for facilitating the communication of neighboring network information to the mobile terminal is shown. In general, while operating in WLAN 102, mobile terminal 106 sends a request for neighboring network information to WLAN 102. The NAS associated with wireless AP 112 of WLAN 102 receives and identifies such request and, in response, produces and sends a corresponding request for the neighboring network information in accordance with a RADIUS compatible protocol. The corresponding request may be sent to AAA server 180 of core network 136 of (e.g. the home) PLMN 104 associated with mobile terminal 106. AAA server 180 has access to and retrieves the neighboring network information in response to the corresponding request. The neighboring network information may be correlated based on NAS location or the like, and may be stored either locally or at a mobility server. For example, the neighboring network information may be stored in a database based on an identification of the NAS. The neighboring network information includes one or more network identifications of one or more wireless networks (e.g. other surrounding PLMNs, WLANs in the figure) located within the vicinity of WLAN 102. The wireless networks identified may be any suitable type of wireless networks, including GSM, GPRS/EDGE, UMTS, WLANs, WiMAX, etc. AAA server 180 replies, in accordance with the RADIUS compatible protocol, to the NAS of wireless AP 112 with a response which includes the retrieved neighboring network information. The NAS of wireless AP 112 then sends the neighboring network information to mobile terminal 106. Thereafter, mobile terminal 106 may make a handover decision for handover from the WLAN 102 to a selected one of the other wireless networks identified from the received network identifications. Note that, in some embodiments, the communications for obtaining the neighboring network information are facilitated via proxy server 190 of LAN 110, which is described in more detail later below.

In one embodiment, the procedures are performed in accordance with Media Independent Handover (MIH) defined by IEEE 802.21. The IEEE 802.21 standard defines a transport agnostic protocol for MIH and three services: a command service to co-ordinate handover between mobile terminals and networks; an event server to exchange link state information between mobile terminals and networks; and an information service to exchange information on neighboring network handover candidates.

Thus, the request/response for the neighboring network information may be an IEEE 802.21 information request/response. For a wireless network that is a WLAN, the request/response may be communicated in accordance with IEEE 802.11u or an extensible authentication protocol (EAP). Under IEEE 802.11u, a mobile terminal requests information from the WLAN in order to obtain network service information using the defined generic access service (GAS) procedures. IEEE 802.11u specifies two mechanisms to obtain the information, one for unicast and one for multicast. In both mechanisms, the mobile terminal initiates service discovery by sending a GAS Initial Request frame. The mobile terminal sends a GAS Initial Request frame since the service information is not included in the beacon or probe response(s). For a wireless network that is a WiMAX network, the request/response may be communicated in accordance with IEEE 802.16g.

Figure 5:
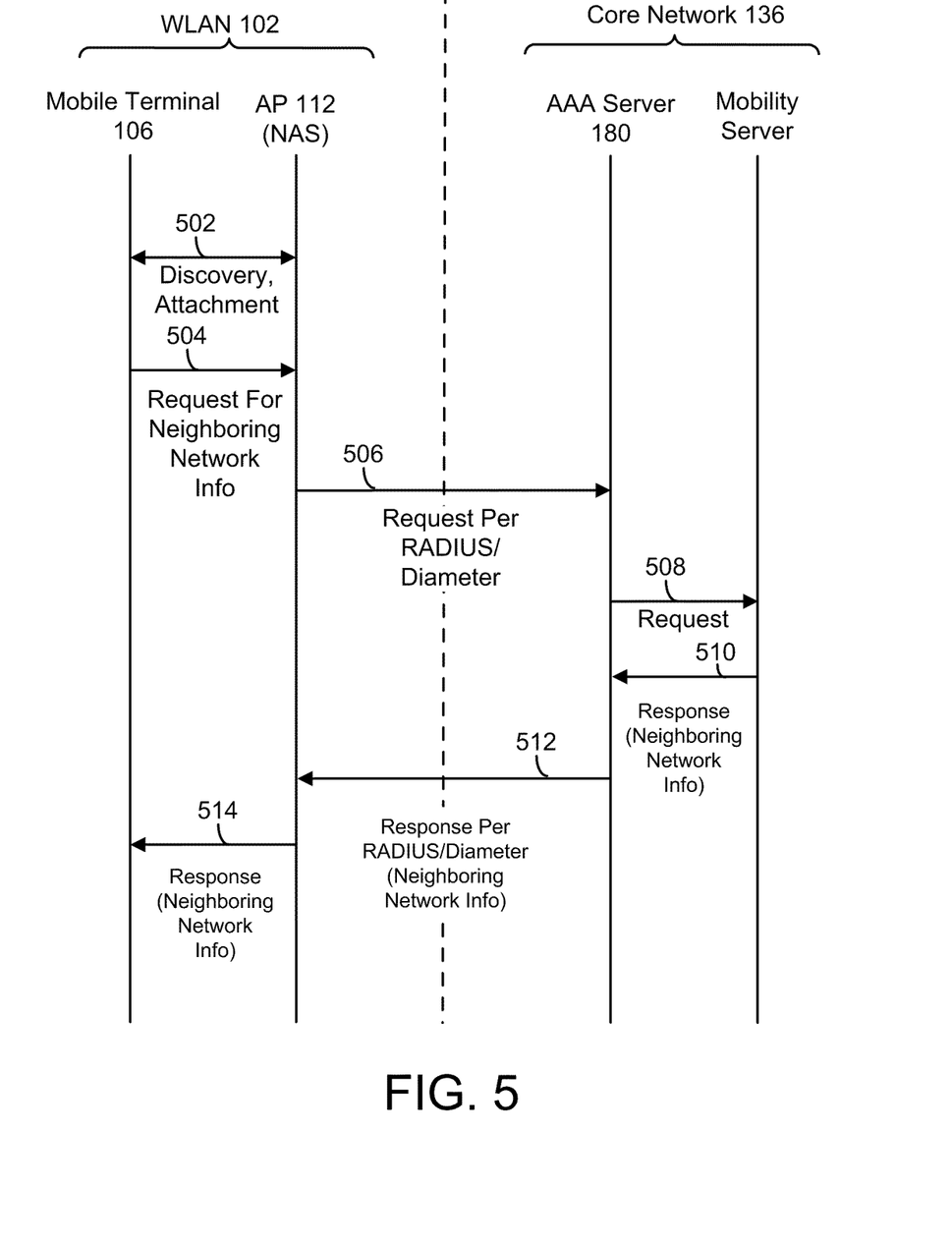
FIG. 5 is a process flow diagram for describing a technique for use in facilitating communication of neighboring network information to the mobile terminal in the environments described in relation to FIGS. 1-4.

FIG. 5 is a process flow diagram for describing a technique for use in facilitating communication of neighboring network information to a mobile terminal, which may be utilized in the environment described above in relation to FIGS. 1-4. The technique of the present disclosure may be embodied in a server (e.g. a network access server, an information server which may be an AAA server, RADIUS server, etc.) having one or more processors. Other techniques may be embodied in a mobile terminal having one or more processors adapted to execute the technique. The technique may be further embodied in a computer program product having a computer readable medium and computer instructions stored in the computer readable medium, where the one or more processors are operative to execute the computer instructions in accordance with the method. In the present discussion, it is assumed that the NAS is part of AP 112, even though it may be an entity in WLAN 102 that is separate from AP 112.

The method of FIG. 5 begins where mobile terminal 106 performs a discovery and attachment procedure with AP 112 of WLAN 102 (step 502 of FIG. 5). The discovery procedure with AP 112 involves scanning to identifying available wireless networks in the coverage region of mobile terminal 106. The discovery procedure may include the mobile terminal's sending of a probe request and the receiving of a probe response. If the probe request/response is successful, an authentication request and response is exchanged. Successful authentication permits further specified data exchange, for example, to the attachment procedure. During the attachment procedure, an association request and response is exchanged. Successful association permits further specified data exchange such as data frames, management frames, and control frame. The association request data frame may, for example, include capability information, listen interval, SSID of WLAN 102, and supported rates. The association response data frame may, for example, include capability information, status codes, association ID, and supported rates.

After its association with AP 112, mobile terminal 106 produces and causes a request for neighboring network information to be transmitted via WLAN 102 (step 504 of FIG. 5). The request may include various information including an identification of mobile terminal 106 (e.g. telephone number, personal identification number or PIN, e-mail address, etc.) and an identification of WLAN 102 (e.g. set service identification or SSID, extended SSID or ESSID, etc.). This request may be or include an IEEE 802.21 information request for the neighboring network information. In the case of IEEE 802.11, for example, the request may be communicated in accordance with IEEE 802.11u or, more specifically, IEEE 802.11u generic access service (GAS). In the case of IEEE 802.16, for example, the request may be communicated in accordance with IEEE 802.16g.

AP 112 identifies this request to be for obtaining neighboring network information (e.g. it may identify it as an IEEE 802.21 information request). In response, AP 112 performs certain processing to obtain this information on behalf of mobile terminal 106. In particular, AP 112 produces a corresponding request for the neighboring network information in accordance with a remote access dial-in user server (RADIUS) compatible protocol. The RADIUS compatible protocol utilized may be a RADIUS protocol. As another example, the RADIUS compatible protocol may be a Diameter NASREQ protocol, which is backward-compatible with RADIUS. Note that, as a NAS function may be part of AP 112, this NAS function may include a RADIUS or RADIUS compatible (e.g. Diameter or Diameter NASREQ) client to serve these purposes. AP 112 sends the corresponding request in accordance with the RADIUS compatible protocol to AAA server 180 of core network 136 (step 506 of FIG. 5), which receives it. AP 112 addresses the corresponding request to AAA server 180 based on a network access identifier (NAI) of mobile terminal 106 and a NAS Port of the NAS in AP 112, which are supplied in the request. In one embodiment, a RADIUS type-length value (TLV) may be utilized in the communication of the corresponding request. The TLV may include a type indicative of "inter-working-request", a length which is variable, and a value which is the string containing the request in accordance with IEEE 802.21 MIH or IEEE 802.11u GAS.

In response to receiving the request of step 506, AAA server 180 retrieves neighboring network information corresponding to an indication provided in the request. In the present example, the indication is provided to AAA server 180 by the identification of WLAN 102 (e.g. SSID or ESSID), and/or cell identifications (Cell IDs), and/or the NAS ID of the AAA client, as supplied from the request. The neighboring network information includes one or more network identifications corresponding to one or more wireless communication networks neighboring or within the coverage region of WLAN 102. The wireless networks identified may be any type of suitable wireless networks, including GSM, GPRS/EDGE, UMTS, WLANs, WiMAX, etc. AAA server 180 may selectively retrieve neighboring network information that is unique to each given location as indicated in such requests. At least some of the networks indicated by the neighboring network information are networks that mobile terminal 106 may be handed over to in the event mobile terminal 106 exits from WLAN 102. The one or more neighboring wireless communication networks may be compatible with cellular telecommunications, IEEE 802.11, or IEEE 802.16 standards, as examples.

AAA server 180 may retrieve the neighboring network information from a locally-stored table, or a database, using a request/response protocol with the indication or location from the request as an input or key. In one embodiment, AAA server 180 may retrieve the neighboring network information from a different server, such as an outside, external mobility server. In this example, AAA server 180 may submit a request to the mobility server with the indication or location (step 508 of FIG. 5) and, in response, receive a response which includes the neighboring network information (step 510 of FIG. 5).

Note that the mobility server may be adapted to receive and serve requests from many different similarly-situated servers (one of which is AAA server 180) deployed in different networks at different locations. The mobility server may have access to one or more databases which store local, regional, or global network information (such as a global network map), information which may be retrieved request/response protocol which utilizes an indication or location as an input or key, for example.

After such retrieval, AAA server 180 sends the neighboring network information to AP 112 in accordance with the RADIUS compatible protocol, and AP 112 receives this information in response (step 512 of FIG. 5). AP 112 then suitably formats and sends, to mobile terminal 106, a response to the initial request which includes the neighboring network information (step 514 of FIG. 5). The response may be or include an IEEE 802.21 information response having the neighboring network information. In the case of IEEE 802.11, for example, the response may be communicated in accordance with IEEE 802.11u. In the case of IEEE 802.16, for example, the response may be communicated in accordance with IEEE 802.16g.

Again, the neighboring network information includes one or more network identifications of one or more wireless networks located within the coverage region of WLAN 102. The neighboring network information may thereafter be utilized by mobile terminal 106 to perform a handover to another neighboring network different from and neighboring the coverage region of mobile terminal 106 or WLAN 102, without the need to perform exhausting scanning operations to locate various different neighboring networks.

Figure 6:
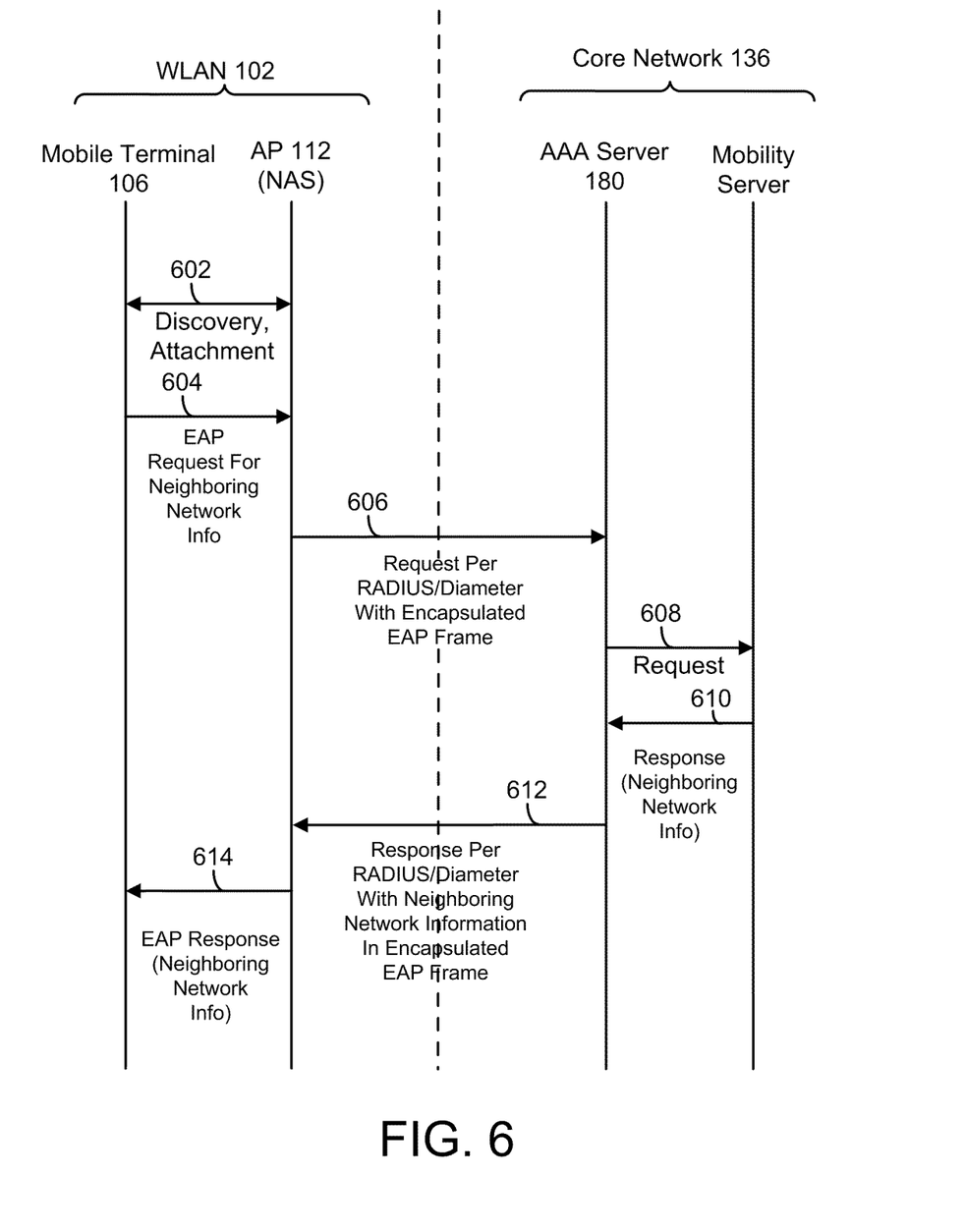
FIG. 6 is another process flow diagram for describing another technique for use in facilitating communication of neighboring network information to the mobile terminal in the environments described in relation to FIGS. 1-4.

FIG. 6 is another process flow diagram for describing another technique for use in facilitating communication of neighboring network information to the mobile terminal, which also may be utilized in the environment described above in relation to FIGS. 1-4. Again, the technique of the present disclosure may be embodied in a server (e.g. a network access server, an information server such as an AAA server, etc.) having one or more processors. Other techniques may be embodied in a mobile terminal having one or more processors adapted to execute the technique. The technique may be further embodied in a computer program product having a computer readable medium and computer instructions stored in the computer readable medium, where the one or more processors are operative to execute the computer instructions in accordance with the method. In the present discussion, it is assumed that the NAS is part of AP 112, even though it may be an entity in WLAN 102 that is separate from AP 112.

Similar to that described in relation to FIG. 5, the method of FIG. 6 begins where mobile terminal 106 performs a discovery and attachment procedure with AP 112 of WLAN 102 (step 602 of FIG. 6). The discovery procedure with AP 112 involves scanning to identify available wireless networks in the coverage region of mobile terminal 106. The discovery procedure may include the mobile terminal's sending of a probe request and the receiving of a probe response. An authentication request and response is exchanged once the probe request/response is successful. Successful authentication permits further specified data exchange, for example, to the attachment procedure. During the attachment procedure, an association request and response is exchanged. Successful association permits further specified data exchange such as data frames, management frames, and control frame. The association request data frame may, for example, include capability information, listen interval, SSID of WLAN 102, and supported rates. The association response data frame may, for example, include capability information, status codes, association ID, and supported rates.

After its association with AP 112, mobile terminal 106 performs an authentication procedure with the network. The authentication procedure may be performed in accordance with an extensible authentication protocol (EAP). During this procedure, mobile terminal 112 causes a request for neighboring network information to be transmitted to AP 112 in an EAP frame (step 604 of FIG. 6). The request may include various information including an identification of mobile terminal 106 (e.g. telephone number, personal identification number or PIN, e-mail address, etc.) and an identification of WLAN 102 (e.g. set service identification or SSID, extended SSID or ESSID, etc.). This request may be or include an IEEE 802.21 information request for the neighboring network information.

AP 112 identifies this request to be for obtaining neighboring network information (e.g. it may identify it as an IEEE 802.21 information request) and, in response, performs certain processing to obtain this information on behalf of mobile terminal 106. In particular, AP 112 produces a corresponding request for the neighboring network information in accordance with a RADIUS compatible protocol. The RADIUS compatible protocol utilized may be a RADIUS protocol or a Diameter NASREQ protocol (which is backward-compatible with RADIUS), as examples. Note that, as a NAS function may be part of AP 112, this NAS function may include a RADIUS or RADIUS compatible client (e.g. Diameter NASREQ client) to serve these purposes. In the present embodiment, AP 112 encapsulates the EAP request for the neighboring network information into the corresponding RADIUS-compatible request and sends it to AAA server 180 of core network 136 (step 606 of FIG. 6), which receives it. AP 112 addresses the corresponding request to AAA server 180 based on a network access identifier (NAI) of mobile terminal 106 and a NAS Port of the NAS in AP 112, which are supplied in the request.

In one embodiment, the request is embedded as a type-length value (TLV) in an EAP frame from mobile terminal 106, and the corresponding request includes a RADIUS attribute set to an EAP-message (e.g. value of 79). In general, this messaging may be viewed as an EAP TLV embedded in a RADIUS TLV. Any suitable implementation or protocol may be utilized for such messaging, such as EAP-FAST TLV based on RFC 4851, Protected EAP Protocol (PEAP) (e.g. Palekar et al., "Protected EAP Protocol (PEAP) Version 2", EAP Working Group, 15 Oct. 2004, Internet-Draft: draft-josefsson-pppext-eap-tls-eap-10.txt), or EAP-TTLS described as AVPs in RFC 5281, as examples.

In response to receiving the request of step 606, AAA server 180 decapsulates the message to reveal the underlying EAP request for the neighboring network information. Then, AAA server 180 retrieves neighboring network information corresponding to an indication provided in the request. In the present example, the indication provided to AAA server 180 by the identification of WLAN 102 (e.g. SSID or ESSID), and/or cell identifications (Cell IDs), and/or the NAS ID of the AAA client, as supplied in the request. As described above in relation to FIG. 5, the neighboring network information of FIG. 6 includes one or more network identifications corresponding to one or more wireless communication networks neighboring the WLAN 102. The wireless networks identified may be any type of suitable wireless networks, including GSM, GPRS/EDGE, UMTS, WLANs, WiMAX, etc. AAA server 180 may retrieve the neighboring network information from the locally-stored table or the database using the request/response protocol, or from a different server such as the mobility server, where AAA server 180 submits a request to the mobility server with the indication of the location (step 608 of FIG. 6) and receives a response which includes the neighboring network information (step 610 of FIG. 6).

After such retrieval, AAA server 180 produces an EAP response which includes the neighboring network information. The EAP response is encapsulated in the RADIUS compatible protocol and sent to AP 112; AP 112 receives this information in response (step 612 of FIG. 6). Upon receipt, AP 112 decapsulates the message to reveal the underlying EAP response having the neighboring network information. AP 112 sends, to mobile terminal 106 in response to the EAP request of step 604, the EAP response which includes the neighboring network information (step 614 of FIG. 6). The EAP response may be or include an IEEE 802.21 information response having the neighboring network information. The neighboring network information may thereafter be utilized by mobile terminal 106 to perform a handover to another neighboring network different from and neighboring the coverage region of mobile terminal 106 or WLAN 102 (e.g. based on RSSI, SNR, or other signal conditions or events), without the need to perform exhausting scanning operations to locate various different neighboring networks.

In the processes described in relation to FIGS. 5 and 6, it may be assumed that a single service provider manages PLMN 104/core network 136, mobile terminal 106, and WLAN 102; therefore, no AAA proxying in WLAN 102 may be required for the communications. Here, mobile terminal 106 may be identified by and associated with the NAI of "user@abc.com", WLAN 102 may be an "ABC" hotspot, and AAA server 180 may be addressable or identifiable by the domain of "abc.com". Again, communications between the NAS of WLAN 102 and AAA server 180 of core network 136 may be direct without the need for proxying.

In alternate embodiments, however, different service providers may be involved where proxying in WLAN 102 is utilized. For example, a first service provider may manage PLMN 104/core network 136 and mobile terminal 106, whereas a second different service provider may manage WLAN 102. In such alternate embodiment, AAA "proxy" server 190 is provided in LAN 110, for proxying the communications between the NAS and AAA server 180 (see FIGS. 1 and 4). Here, mobile terminal 106 may be identified by and associated with the NAI of "user@abc.com", AAA server 180 of core network 136 may be addressable or identifiable at "abc.com", WLAN 102 may be a "DEF" hotspot, and proxy server 190 of LAN 110 may be addressable or identifiable at the domain of "def.com". In the technique, mobile terminal 106 submits its request to the NAS, providing its NAI which includes the realm of "abc.com". The NAS provides the request to proxy server 190, which identifies the realm of "abc.com" in the request and directs the request to AAA server 180 of core network 136 associated with "abc.com". AAA server 180 processes the request accordingly and submits a response back to proxy server 190, which provides it back to the NAS of WLAN 102 and thereafter to mobile terminal 106. As apparent, NAIs and realms may be utilized to facilitate the communication of proper neighboring network information for mobile terminals. Also as apparent, mobile terminal 106 may cause the request to be transmitted to the proper AAA server in different ways.

Thus, according to the present disclosure, the communication of neighboring network information to mobile terminals is efficiently facilitated for handover purposes, without requiring excessive scanning by the mobile terminal, and without burdensome and difficult deployment of network components or modules in existing networks.

As described herein, a technique in a radio access network (e.g. in a network access server or NAS) involves receiving, from a mobile terminal, a request for neighboring network information; producing, in response to receiving the request, a corresponding request for the neighboring network information in accordance with a remote access dial-in user server (RADIUS) compatible protocol; sending the corresponding request to an information server (e.g. an AAA server, a RADIUS server, a Diameter NASREQ server, etc.) of a core network of a public land mobile network (PLMN) associated with the mobile terminal; receiving, from the information server, in response to sending the corresponding request, the neighboring network information in accordance with the RADIUS compatible protocol; and sending, in response to the request, the neighboring network information to the mobile terminal. The request/response for the neighboring network information may be an IEEE 802.21 information request/response. If the radio access network is a wireless local area network (WLAN) adapted in accordance with IEEE 802.11, the request/response may be communicated in accordance with IEEE 802.11u or an extensible authentication protocol (EAP). If the radio access network is a WiMAX network adapted in accordance with IEEE 802.16, the request/response may be communicated in accordance with 802.16g.

As further described herein, a technique in the information server of the core network of the PLMN involves receiving, from the radio access network, a request for neighboring network information in accordance with a RADIUS compatible protocol (e.g. RADIUS or Diameter NASREQ); retrieving, in response to receiving the request, neighboring network information corresponding to an indication provided in the request; and sending, to the radio access network, in response to receiving the request, the retrieved neighboring network information in accordance with the RADIUS compatible protocol.

As described, the techniques of the present disclosure may be embodied in a server (e.g. a network access server, an information server such as an AAA server, etc.) having one or more processors. Other techniques may be embodied in a mobile terminal having one or more processors adapted to execute the technique. The technique may be further embodied in a computer program product having a computer readable medium and computer instructions stored in the computer readable medium, where the one or more processors are operative to execute the computer instructions in accordance with the method. Further, the technique described assumes that the mobile terminal is a mobile communication device of the dual-mode type, having both WLAN and WWAN radio interfaces. In an alternative embodiment, however, mobile terminal 106 may have only a single (radio) interface for access (e.g. only WLAN radio interface 122) and operates accordingly without the other interface.

The above-described embodiments of the present application are intended to be examples only. Those of skill in the art may affect alterations, modifications and variations to the particular embodiments without departing from the scope of the application. For example, the embodiments of the present disclosure are generally directed to an example where the WLAN is an IEEE 802.11-based network and the WWAN is a cellular telecommunications network. However, the WLAN and WWAN may be networks different from those networks. The WLAN may be a WiMAX-based network (i.e. IEEE 802.16), an Ultra-WideBand (UWB)-based network (i.e. IEEE 802.15), a Bluetooth-based network, as a few examples. The WWAN may be a Long-Term Evolution (LTE)-based network, an EVolution-Data Only (EV-DO)-based network, or a UMTS-based network, as a few examples. The embodiments described herein in the recited claims intend to cover and embrace all suitable changes in technology.

What is claimed is:

1. A method for requesting neighboring network information to identify neighboring networks by a device, the method comprising:

encoding, by the device located in a first network, a request for neighboring network information, the request including a network access identifier (NAI), the NAI identifying a first realm of the first network, wherein the neighboring network information includes one or more network identifications corresponding to one or more wireless communication networks neighboring or within a coverage region of a network access device in communication with the device;

sending, by the device to an access point of the first network, the request for neighboring network information to an information server to obtain the neighboring network information from a second network based on the first realm being identified in the NAI, wherein the first network is a wireless local area network (WLAN), the request causes the access point of the WLAN to query the information server for the neighboring network information, and the query is in accordance with at least one of a RADIUS protocol or a DIAMETER protocol;

receiving, by the device, a response to the request, the response generated by the access point of the first network, the response including the neighboring network information;

decoding, by the device, the neighboring network information from the response;

identifying, by the device, one or more available neighboring networks neighboring the first network based on the decoded neighboring network information;

determining, by the device, one neighboring network within the one or more available neighboring networks identified in the decoded neighboring network information; and refraining, by the device, from performing scanning operations to locate different neighboring networks.

2. The method of claim 1, wherein said encoding is in accordance with an extensible authentication protocol (EAP).

3. The method of claim 1, wherein the encoding is based on an IEEE 802.21 format.

4. The method of claim 1, wherein the request and the response are transported utilizing at least one of an IEEE 802.1X format or an IEEE 802.11u format.

5. The method of claim 1, wherein the request is transported using an extensible authentication protocol (EAP) within at least one of a RADIUS protocol or a DIAMETER protocol.

6. The method of claim 1, wherein the second network is a core network of a public land mobile network.

7. A mobile terminal located in a current network coverage region for requesting neighboring network information to identify neighboring networks by the mobile terminal, the mobile terminal comprising:

a hardware processor configured to:

encode a request for neighboring network information, the request including a network access identifier (NAI), the NAI identifying a first realm, wherein the neighboring network information includes one or more network identifications corresponding to one or more wireless communication networks neighboring or within a coverage region of a network access device in communication with the mobile terminal;

send, to an access point of a first network, the request, the request for neighboring network information to an information server to obtain the neighboring network information from a second network based on the first realm being identified in the NAI, wherein the first network is a wireless local area network (WLAN), the request causes the access point of the WLAN to query the information server for the neighboring network information, and the query is in accordance with at least one of a RADIUS protocol or a DIAMETER protocol;

receive a response to the request, the response generated by the access point of the first network, the response including the neighboring network information;

decode the neighboring network information from the response;

identify one or more available neighboring networks neighboring the first network based on the decoded neighboring network information;

determine one neighboring network within the one or more available neighboring networks identified in the decoded neighboring network information; and refrain from performing scanning operations to locate different neighboring networks.

8. The mobile terminal of claim 7, wherein said encoding is in accordance with an extensible authentication protocol (EAP).

9. The mobile terminal of claim 7, wherein the encoding is based on an IEEE 802.21 format.

10. The mobile terminal of claim 7, wherein the request and the response are transported utilizing at least one of an IEEE 802.1X format or an IEEE 802.11u format.

11. The mobile terminal of claim 7, wherein the request is transported using an extensible authentication protocol (EAP) within at least one of a RADIUS protocol or a DIAMETER protocol.

12. The mobile terminal of claim 7, wherein the second network is a core network of a public land mobile network.

13. A non-transitory machine-readable medium with a set of instructions stored thereon, which when executed, cause a processor to perform operations for requesting neighboring network information to identify neighboring networks by a device located in a first network, the operations comprising:

encoding a request for neighboring network information, the request including a network access identifier (NAI), the NAI identifying a first realm of the first network, wherein the neighboring network information includes one or more network identifications corresponding to one or more wireless communication networks neighboring or within a coverage region of a network access device in communication with the device;

sending the request to an access point of the first network, the request for neighboring network information to an information server to obtain the neighboring network information from a second network based on the first realm being identified in the NAI, wherein the first network is a wireless local area network (WLAN), the request causes the access point of the WLAN to query the information server for the neighboring network information, and the query is in accordance with at least one of a RADIUS protocol or a DIAMETER protocol;

receiving a response to the request, the response generated by the access point of the first network, the response including the neighboring network information;

decoding the neighboring network information from the response;

identifying one or more available neighboring networks neighboring the first network based on the decoded neighboring network information;

determining one neighboring network within the one or more available neighboring networks identified in the decoded neighboring network information; and refraining from performing scanning operations to locate different neighboring networks.

14. The non-transitory machine-readable medium of claim 13, wherein said encoding is in accordance with an extensible authentication protocol (EAP).

15. The non-transitory machine-readable medium of claim 13, wherein the encoding is based on an IEEE 802.21 format.

16. The non-transitory machine-readable medium of claim 13, wherein the request and the response are transported utilizing at least one of an IEEE 802.1X format or an IEEE 802.11u format.

* * * * *